Jan. 22, 1963   G. MAY ETAL   3,074,839
METHOD OF MAKING HONEYCOMB MATERIAL
Filed Sept. 13, 1957   2 Sheets-Sheet 1
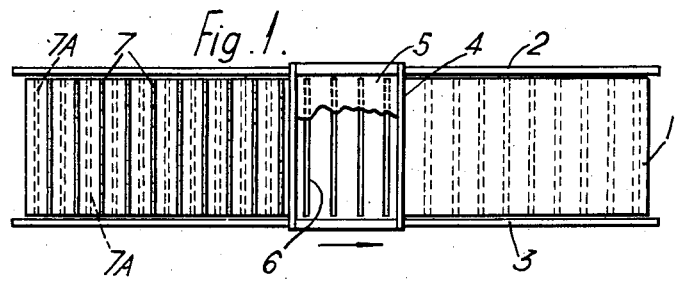
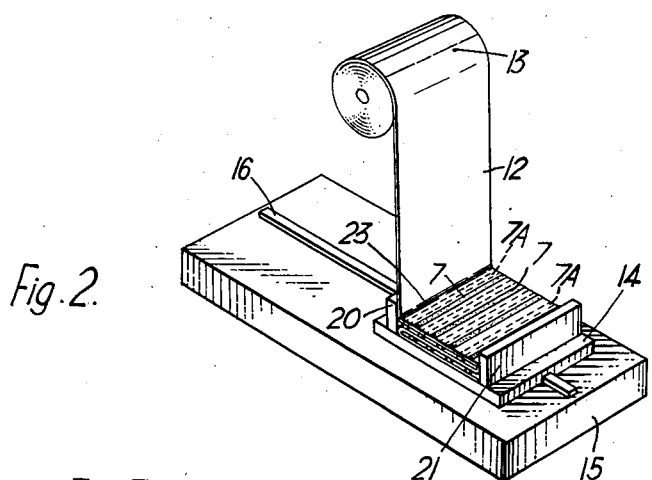
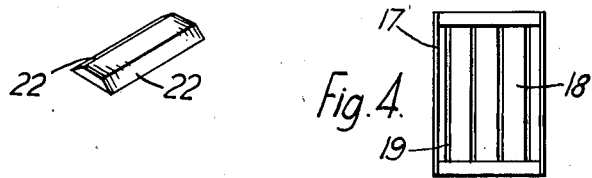
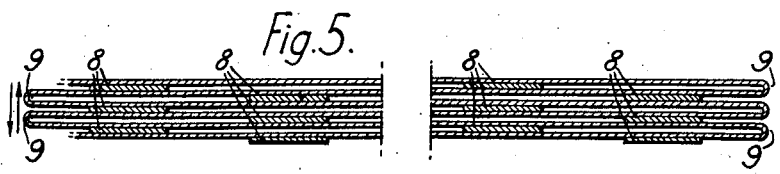
Inventors
GEORGE MAY
AND JOHN HENRY GORELL
By Linton and Linton
Attorneys Jan. 22, 1963  G. MAY ETAL  3,074,839
METHOD OF MAKING HONEYCOMB MATERIAL
Filed Sept. 13, 1957
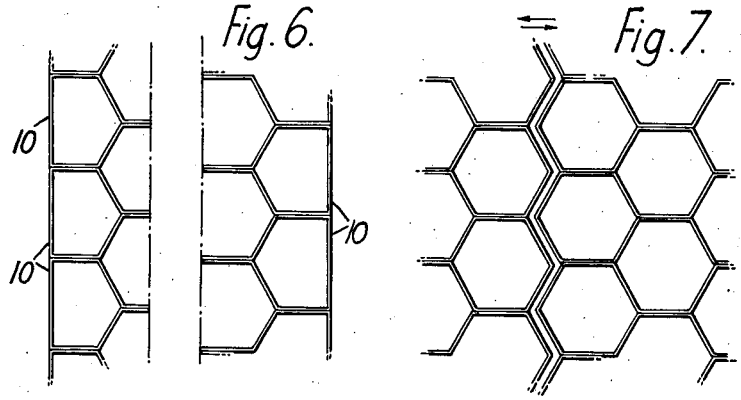
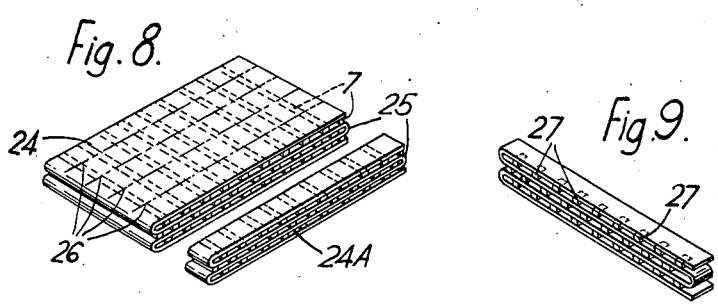
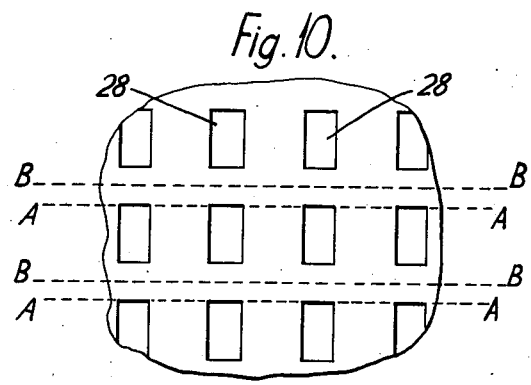
Inventors
GEORGE MAY
AND JOHN HENRY GORELL
By
Linton and Linton
Attorneys 3,074,839
METHOD OF MAKING HONEYCOMB MATERIAL
George May and John Henry Gorell, London, England, assignors to Messrs. Dufaylite Developments Limited
Filed Sept. 13, 1957, Ser. No. 683,810
Claims priority, application Great Britain Sept. 17, 1956
3 Claims. (Cl. 156—197)

The present invention relates to structural honeycomb materials of the honeycomb type, and has as an object the provision of such materials in improved form. The present invention has as a further object the provision of an improved method of producing structural honeycomb materials.

Structural honeycomb materials have become very popular during recent years for use as fillings for structural components in the building and aircraft industries in situations where structural components having a high strength to weight ratio are required.

Structural honeycomb materials in a form suitable for use as fillings are obtainable by expanding, that is to say opening out into cellular form, a pack of strips of sheet material, the strips in the pack being adhesively secured together by lines of adhesive running transversely of the strips, the lines of adhesive in contact with one face of any particular strip being staggered with reference to the lines on the other face of said strip. The width of the strips is equal to the thickness of the honeycomb measured in the direction of the axes of the cells produced on expansion. The ratio of the width of the lines of adhesive to the spacing between the lines is usually set so that the cells have the form of regular or substantially regular hexagons.

Various types of sheet material may be employed for forming the strips, the most common materials being paper and metal foil, although other sheet materials such as woven fabrics especially glass fabrics, may be employed if desired. The expanded material is advantageously set in its expanded condition by curing a thermo-setting resin coated on or impregnated into the sheet material. The resin may be applied in an un-cured state to the sheet material either before it is formed into the pack of strips, or after the expansion. When honeycomb materials in the expanded state are faced on either side with panels adhesively secured thereto, there results a very strong structure in which the cells are oriented with their axes running between the panels.

The pack of strips is usualy produced by cutting a slice from a stack of sheets of the sheet material, the sheets in the stack being adhesively secured together by lines of adhesive which run perpendicular to the direction of slicing. An occasional practice, which is applicable where dimensional accuracy of the material is unimportant, is to expand the stack of sheets and to slice after expansion. Where such a practice is followed, the pack of strips is never obtained as such, being only encountered in an expanded state. Where use is made hereinafter of the term "a pack of strips," it is to be understood that the said term is, unless otherwise demanded by the context, intended to extend not only to a pack in which the faces of the strips are in contact over the whole of their areas, but also to a pack in its expanded state. As will be appreciated any honeycomb material in the expanded state has a counterpart in a pack of strips even though in some cases, for example where the sheet material is heavily resinated and cannot be closed without fracture to yield a pack in which the faces of the strips are in contact at all positions, the relationship is a purely theoretical one.

The stack of sheets from which the pack of strips is cut, may be produced by a variety of different methods from a continuous web of the sheet material or from cut sheets of the sheet material. One method of producing the stack from a continuous web involves folding the web to give a stack in which the sheets are connected together by folds at the ends of the stack. Whatever method is adopted the lines of adhesive are always arranged to run parallel with the machine direction of the sheet material, that is to say in the direction in which the sheet material has passed through the machinery (e.g., the paper mill, the loom or the rolling mill) in the course of its manufacture. Thus where the stack is produced by folding a continuous web the lines of adhesive are arranged to run parallel with the edges of the web and hence at right angles to the folds and where the stack is produced from cut sheets of the sheet material the lines are arranged to run parallel with those edges which run in the machine direction. Where, as in the usual case, the sheets are produced by cutting a continuous web (the lines of adhesive may be applied before cutting if desired), the lines of adhesive are always arranged parallel with edges of the sheets which have, or some of which have, constituted edges of the web itself.

As the pack of strips is necessarily produced by cutting across the lines of adhesive, the length of the pack and hence the dimension of the honeycomb material taken at right angles to the axes of the cells and to the direction of expansion is limited by the width of the material measured across the machine direction thereof and, owing to the inevitable shrinkage in width produced on expansion, is always less than said width. One major dimension of the expanded material is accordingly limited by the width of the sheet material available and/or by the width of the stack making apparatus, which for reasons of capital economy, must usually be kept fairly small.

In the case of most papers, the individual fibres present tend to be oriented in the machine direction and we have found that this orientation has a slight beneficial effect on the compressive strength of honeycomb materials produced therefrom. In the case of some modern papers, the fibres have no preferred direction of orientation and the said slight beneficial effect is not therefore obtainable therewith.

The present invention is based upon the discovery that substantial advantages may be obtained by arranging that the longitudinal axes of the strips, rather than the lines of adhesive run in the machine direction of the material.

Accordingly, the present invention provides a structural honeycomb material which comprises a pack of strips of a sheet material whose longitudinal axes run in the machine direction of the sheet material, in which pack adjacent faces of the strips are adhesively secured together over a plurality of securing zones spaced apart along the length of said pack, the securing zones of pairs of adjacent faces thus secured being staggered in the direction of the length of the pack with reference to the securing zones of other pairs of adjacent faces disposed between said pairs.

The material is preferably produced in the unexpanded state by a method which comprises securing together layers of sheet material to form a stack by means of an adhesive distributed in elongated securing zones which cross, and are spaced apart in, the machine direction of the sheet material and are positioned such that the securing zones over which pairs of adjacent faces of the layers are secured together are staggered in the machine direction with reference to the securing zones over which other pairs of adjacent faces disposed between said pairs are themselves secured together, and forming the stack into a plurality of packs of strips of the sheet material by cutting it in the machine direction. It will be understood however that it is within the scope of the invention to omit the cutting step and thus produce a pack wherein the width of the strips is equal to the width, measured across the machine direction, of the sheet material employed. When in the expanded state, the thickness of the honeycomb material measured in the direction of the axes of the cells is equal, or substantially equal to the width of the strips from which it is formed and the maximum thickness obtainable in accordance with the invention is limited only by the width, taken across the machine direction, of the sheet material employed.

The size of the honeycomb material (perpendicular to the axes of the cells and to the expansion direction) depends only upon the length of the strips and as sheet materials are normally obtainable in long continuous lengths, said size can be as great as desired. In the prior art it was limited by the width of the material. The size in the expansion direction depends upon the number of strips employed and can obviously be made as large as desired.

The said securing zones may extend across the faces of said strips from one longitudinal edge to the other. Alternatively, however, they may extend only part way across the strips so that at one or both faces of the filling produced by expanding the pack the strips have edge portions which are free from adhesion together at all points. This arrangement leads to the formation of a filling which can be readily bent to a simple or complex curved form with little or no tendency to produce unwanted curvatures and which is therefore advantageous where non-planar structural components are to be manufactured therefrom. It is found that in practice no substantial weakening results from the freedom of the strips from adhesive on one or both faces of the material since as will be appreciated in forming panel-faced curved structures the edges of the strips are adhesively secured to the curved facing panels along the whole of their lengths.

Preferably the strips are adhesively secured together over the whole area of each of said securing zones. It is, however, within the scope of the invention to employ a pack in which the adhesion extends not over the whole area of the zones, but merely over portions thereof, for example, over marginal portions of the zones or in arrays of small areas distributed over each zone. Such distribution of adhesive may be employed without disadvantage as regards strength of the material when the pack is to be set in its expanded condition by curing a thermo-setting resin coated on or impregnated into the strip material. In this case advantage is taken of the adhesive properties of the thermo-setting material itself.

Normally in forming the pack of strips, each strip is adhesively secured to the next strip over a plurality of securing zones and each strip which has securing zones at each of its faces (i.e., each strip apart from the first and last strips of the pack) has the securing zones at one face in staggered relationship with the securing zones at the other face. It is, however, within the scope of the invention to arrange that no expansion takes place between one or more pairs or larger groups of adjacent strips so that said groups of strips form cell walls of double or multiple thickness in the honeycomb structure. The adjacent faces of such strips may be adhesively secured together over the whole of their mutually contacting faces or may be adhesively secured together over zones which are not staggered as aforesaid. If desired, strips which are destined to provide cell walls of double or multiple thickness may be formed of a material or materials which is or are different from the material of the strips forming the remainder of the pack. For example, in the case of a pack in which the majority of the strips are formed of paper, they may be formed of thicker paper or of metal foil or of resin impregnated glass cloth, where special strength effects are required.

The structural honeycomb materials of the present invention may, as with the honeycomb materials known hitherto, be produced by using the sheet material in the form of cut lengths (which in the present case may be regarded as the strips of the pack when no step of cutting in the machine direction is adopted after adhesion) or by folding a web of the sheet material to give strips which are joined together by folds at their ends. If desired, the folds may be trimmed off before expansion.

Where in a block as provided in accordance with said further aspect of the present invention the layers of the sheet material present are interconected by folds at those of their edges which are parallel with the securing zones, the folded edges may, if desired, be trimmed off by slicing or grinding before the block is expanded. They may however be left untrimmed if in accordance with a feature of the invention the securing zones nearest the ends of the strips at at least one end of the pack are positioned to permit expansion of the honeycomb material from the flattened state to an expanded state, i.e., if the securing zones nearest the folds at at least one end of the pack are positioned outside those folds, that is to say they are positioned on that side of the sheet material which is opposite to that which is brought into contact with itself by the fold. With such an arrangement, the folds tend to become straightened when the pack is expanded so that the end portions of the strips act as facings at one or both of those edges of the honeycomb material which run in the direction of expansion. These facings are found to facilitate assembly of the honeycomb material since they provide surfaces by which the edges of the material may conveniently be secured to other components, for example to other portions of honeycomb material of the same type or to closure members for the edges of filled panels. The present invention accordingly provides for the first time a honeycomb material wherein one or both of the marginal edges i.e., those edges which run in the direction of expansion are faced with portions of the sheet material from which the honeycomb material is produced. While said material is preferably produced by folding a web as aforesaid, it will be understood that it may be produced by an alternative procedure from cut sheet material by arranging that each strip of the pack is folded at at least one end thereof to provide at least a part of the next strip of the pack and the securing zones nearest the ends of the faces of the strips are positioned to permit expansion of the honeycomb material from the flattened state to an expanded state. Thus one procedure which may be adopted comprises stacking sheets which have inwardly folded marginal portions and arranging that each folded marginal portion is adhesively secured to the adjacent sheet of the stack, e.g., by a line of adhesive which is spaced from the fold and lies in non-staggered relationship with a line of adhesive by which said adjacent sheet is secured by its margin to the next sheet of the stack. The end portions of the strips may run straight in the direction of expansion to give a material having a straight boundary edge (and to set a limit to the expansion) or they may be inclined to give a zig-zag edge.

The present invention leads to the solution of two problems which are inter-related. Honeycomb fillings as conventionally produced have edges which make them difficult to join together to form joined fillings which are free from lines of weakness. The size of conventionally produced fillings is inherently limited for reasons hereinbefore given but even in their maximum sizes so far obtainable they can be unduly cumbersome to handle in some circumstances. These problems are now removed since the invention enables large fillings to be produced without joining and moreover enables easy joining where required. Thus where large filling is required it provides a choice between making it in one piece and making it in small pieces which can be joined as necessary. Furthermore it enables fillings to be produced in standard sizes which are so graded that a joined honeycomb of virtually any required dimensions can be built up conveniently without cutting off and wasting substantial quantities of material; the standard sizes may for example be inter-related in the same manner as are the weights in a set used with a chemical balance.

In the production of a honeycomb material as provided by the present invention, the adhesive may be applied to the sheet material in any convenient manner but is preferably applied by silk-screen printing or by means of a printing roller. In one procedure which is suitable for use where the sheet material is an absorbent material, e.g., paper or glass cloth, the stack is built up by bringing layers of the sheet material into position in succession and the adhesive is applied to the layers at the time when they are exposed on the stack. This procedure is very simple to operate and enables correct positioning of the adhesive to be obtained with ease.

In another procedure which is preferred where the sheet material is non-absorbent, as for example in the case of metal, but which may also be employed for absorbent materials the adhesive employed is a curable resin which is applied to the sheet material in the form of a solution and dried to leave the resin in the solid but curable state after which the sheet material is formed into the stack of layers and the layers are then secured together by curing the adhesive.

In either procedure, the stack may be formed by folding a continuous web or by stacking cut sheets.

In yet another procedure a continuous web of the material is first folded to produce a stack in which the layers are joined by folds at their ends but which is free from adhesive. It may be regarded as a book in which the pages are of double thickness and which may be opened page by page from either side. The book is opened page by page from the first side and lines of adhesive are applied to each page in turn. The book is then opened page by page from the second-side and lines of adhesive are applied in staggered relationship with those applied when the book was opened from the first side. This procedure is simple to carry out manually and is moreover capable of being mechanised where required. The folds introduced before the adhesive is applied assist in the accurate location of the layers and the staggering of the lines is achieved in a very simple manner.

Any convenient method of bringing a web of the sheet material into a folded condition may be employed in accordance with the invention irrespective of whether the adhesive is applied before, during or after folding. Conveniently, however, folding is effected by feeding the material on to a support which is moved backwards and forwards and forms a fold in the web each time it reverses its direction.

It will be understood that whilst reference has been made herein to honeycomb fillings in which the cells are hexagonal, it is within the scope of the invention to provide honeycomb fillings which have been expanded to the maximum possible extent and have cells of rectangular form.

In order that the invention may be further understood there is given the following description of specific embodiments thereof by way of example. In said description reference is made to the accompanying drawings in which:

FIGURE 1 illustrates the production of a structural honeycomb material in large size, FIGURES 2, 3 and 4 illustrate the production of a joinable structural honeycomb material by folding a continuous web of sheet material, FIGURE 5 shows a cross section of the top five layers of a joinable structural honeycomb material in accordance with the invention, said material being in the flat, i.e., non-expanded state, FIGURES 6 and 7 are plan views of two forms of joinable structural honeycomb material obtainable by the method illustrated in FIGURES 2 to 4, FIGURE 8 shows the manner in which a stack of sheets in accordance with the invention may be slived to produce a plurality of packs of strips also in accordance with the invention, FIGURE 9 shows a further form of structural honeycomb material in accordance with the invention, and FIGURE 10 shows a silk screen which may be employed in producing a material of the type shown in FIGURE 9.

In producing structural honeycomb material as illustrated in FIGURE 1, long sheets of material cut from a roll and having a length which is large compared with the width of the material measured across the machine direction thereof are stacked one by one to form a stack 1 between guide rails 2 and 3. Upon the guide rails is slidably mounted a silk screen device 4 containing a pool of adhesive 5 which may be worked through the spaces 6 of the silk screen to place lines of adhesive 7 upon the exposed face of each sheet of the material when it is exposed at the top of the stack 1. After each sheet has been placed in position upon the stack, lines of adhesive are printed thereon in the transverse direction (i.e., the shorter dimension of the sheets) and in evenly spaced relationship by means of the silk screen device 4, said device being moved in steps along rails 2 and 3 to enable said lines to be distributed along the whole of the length of the sheets. In the stage illustrated in FIGURE 1 the lines of adhesive 7 have been applied to that portion of the top surface of the last-applied sheet which lies to the left of the silk screen device 4, and the adhesive 5 is about to be worked over and through the silk screen by means of for example a squeegee (not shown) to the underlying portion of said top surface. Subsequently the silk screen device will be moved to the right in order to complete the printing of lines on said surface. In a previous operation the sheet now lying below the last applied sheet has been printed with lines 7a of adhesive. Lines 7 and 7a are arranged in mutually staggered relationship with one another.

In the method illustrated in FIGURES 2 to 4 a stack of layers of a sheet material 12 from a horizontally mounted roll 13 thereof, is produced by folding the sheet material upon a platen 14 which is slidably mounted upon a table 15. The table has an upstanding rib 16 which has a sliding fit in a complementary groove formed on the underside of the platen and therefore prevents any turning of the platen as it is moved along the table. After each layer has been applied, lines of adhesive are applied across the machine direction of the sheet material by, for example, a printing roller or a silk screen device, of the form shown in FIGURE 4. In this silk screen device the boundary member 17 of the frame which holds the silk sheet 18 is made narrow in the horizontal direction and is arranged close to the last printing aperture 19 so that the lines of adhesive can be registered correctly without interference from upstanding members 20 and 21 which are provided near the ends of the platen 14. After each set of lines of adhesive, e.g., the lines 7a have been applied, the platen 14 is moved along the table and sheet material 12 is pulled down from the roll 13 and placed so that it covers the lines of adhesive just applied. By means of a bar shaped to have a pair of knife edges 22 (as shown in FIGURE 3) the sheet material is formed with a crease 23 which contacts the upstanding member 20. By further use of the printing device 18, a further set of lines 7 of adhesive is printed on the surface now exposed on the platen, said lines being in staggered relationship with the lines 7a, thus reaching the stage shown in FIGURE 2. The platen is moved back along the table 15. Further sheet material 12 is pulled down from the roll 13 to cover the lines 7, the sheet material being flattened back on itself at the crease 23. A further crease is formed, this time against the upstanding member 21. A set of lines of adhesive is applied directly over lines 7a and the procedure is continued until the required number of layers has been formed.

It will be understood that at one end of the travel of the platen 14, the upstanding member 20 lies below the off-take from the roll 13, and at the other end of the travel the other upstanding member 21 lies below said off-take.

In FIGURE 5 there is shown a cross-section of the top six layers of a stack, produced for example as described with reference to FIGURES 2 to 4. The layers of paper, metal foil or other sheet material are adhesively secured together by lines of adhesive 8 positioned to allow expansion in the direction of the arrows. As will be seen, those lines of adhesive which lie nearest the folds 9 are arranged on that face of the sheet material which is opposite to that which is brought into contact with itself by said fold. On expansion of the stack or a pack of strip produced therefrom, there is obtained an expanded structure of the type shown in FIGURE 6, wherein those boundary edges which run in the direction of expansion are formed of straightened portions 10 of the sheet material. These straightened portions are derived by straightening out the material at the folds 9 shown in FIGURE 5.

By placing the lines of adhesive at a greater distance from the folds than is described in connection with FIGURE 5, there may be obtained a material in which the folds are only partly opened. Two such structures placed in proximity to illustrate the manner in which they may be joined adhesively together are shown in FIGURE 7.

In FIGURE 8 is shown a stack 24 and, cut therefrom, a pack of strips 24a which may be expanded into the form shown in FIGURE 6 or 7 depending upon the distance by which the lines of adhesive 7 are spaced from the folds 25. Further and similar packs may be produced by slicing the stack at positions 26 in the machine direction of the sheet material from which the stack is formed. The pack of strips shown in FIGURE 9 is similar to the pack 24 shown in FIGURE 8 except that the adhesive is applied over securing zones 27 which extend part way only across the width of the strips. Packs of strips of the type shown in FIGURE 9 are readily joinable together as indicated in FIGURE 7, and in addition can readily be curved before or after joining to yield structures of simple or complex curvature. The pack shown in FIGURE 9 can be produced for example by forming and slicing a pack by the methods illustrated in FIGURES 2 to 4 and FIGURE 8 by using, instead of the silk screen shown in FIGURE 4, a silk screen in which the adhesive apertures are arranged in an array of patches 28 as shown in FIGURE 10. To produce a pack as shown in FIGURE 9 the slicing of the stack may be performed along lines corresponding in position with lines A—A of FIGURE 10. In the case shown in FIGURE 9 the patches of adhesive 27 run up to the edges of the strips on one side thereof. If it is required that they should run up to neither side of the strips, slicing may be performed along lines corresponding with lines B—B as shown in FIGURE 10.

As will be understood, FIGURES 1, 2, 4, 8 and 9 are given in diagrammatic form in the interests of clarity. For example in FIGURES 1, 2, 8 and 9, the lines of adhesive are shown far wider than they are in practice, in FIGURES 2, 8 and 9, the thicknesses of the sheet material and of the adhesive are shown greatly exaggerated, in FIGURE 4 the adhesive-permeable lines are shown much wider, and in smaller number, than they are in practice and in FIGURES 8 and 9 the stack and the packs are shown as containing only a very small number of layers or strips.

It will be appreciated that substantial departures may be made from the honeycomb materials and manufacturing procedures specifically described herein without departing from the scope of the invention. For example instead of using the form of slidable platen shown in FIGURE 2 there may be employed lapping machine by means of which the web is folded without manual intervention; additionally the printing of the lines of adhesive can be achieved by fully automatic means thus giving a fully mechanised process.

We claim:
1. A method of producing a structural honeycomb material, which consists in supplying a continuous web of material, accumulating said continuous web into a stack of a desired thickness of superimposed layers with all layers being of the same length, applying parallel equally spaced lines of adhesive to each of said layers transversely to the direction in which said continuous web is supplied with the lines of adhesive of each adjacent two layers in said stack being staggered relative to one another with said adhesive bonding said layers together along said lines of adhesive, slicing said stack transversely of said lines of adhesive and then expanding the slice so obtained to provide a honeycomb material.

2. A method according to claim 1 in which said lines of adhesive are each provided by a series of spaced apart patches of adhesive.

3. A method of producing a structural honeycomb material which consists in supplying a continuous web of material, folding said web of material in a to and fro movement with each folded length being of equal length in the direction of such to and fro movement, laying a single length of said material, applying adhesive to parallel equally spaced apart zones of said single length of material transversely to the direction in which said single length of material was laid, again laying another single length of material in the opposite direction to and upon said first mentioned single length, then applying adhesive to zones of said second single length intermediate those of said first single length, continuing to lay said lengths of material upon one another and applying adhesive thereto in the manner of said first and second layer so that a stack of layers of a desired thickness is provided with each succeeding layer having disposed thereon zones of adhesive which are staggered with respect to the zones of adhesive of adjacent layers with said adhesive bonding of all layers together along said zones of adhesive, cutting said stack at least once transversely of said zones of adhesive and then expanding the slice so obtained to provide a honeycomb structure.

References Cited in the file of this patent

UNITED STATES PATENTS

| | | |
|---|---|---|
| 1,924,472 | Thomson | Aug. 29, 1933 |
| 2,140,709 | Mauser | Dec. 20, 1938 |
| 2,428,979 | May | Oct. 14, 1947 |
| 2,610,934 | Steele | Sept. 16, 1952 |
| 2,649,131 | Lincoln | Aug. 18, 1953 |
| 2,674,295 | Steele et al. | Apr. 6, 1954 |
| 2,731,379 | Wheeler | Jan. 17, 1956 |
| 2,860,740 | Holland et al. | Nov. 18, 1958 |
| 3,032,458 | Daponte et al. | May 1, 1962 |

OTHER REFERENCES

"Wood & Paper-Base Plastics," by A. J. Stamm, Plastics & Resins Industry, November 1943, pages 16 and 28.